US006726101B1

(12) United States Patent
McIntyre et al.

(10) Patent No.: US 6,726,101 B1
(45) Date of Patent: Apr. 27, 2004

(54) ELECTRONIC TRANSACTION TERMINAL SYSTEM

(75) Inventors: Daniel S. McIntyre, Uniontown, OH (US); Allan R. Bakerink, New Philadelphia, OH (US); Steven R. Davis, North Lawrence, OH (US)

(73) Assignee: Diebold, Incorporated, North Canton, OH (US)

(*) Notice: Subject to any disclaimer, the term of this patent is extended or adjusted under 35 U.S.C. 154(b) by 0 days.

(21) Appl. No.: 09/876,536

(22) Filed: Jun. 7, 2001

Related U.S. Application Data

(60) Provisional application No. 60/210,849, filed on Jun. 9, 2000.

(51) Int. Cl.[7] .................................................. G06K 5/00

(52) U.S. Cl. ....................... 235/382; 235/478; 235/475; 235/379; 902/31; 902/10

(58) Field of Search ................................ 235/382, 379, 235/381, 384, 475, 478, 383, 380, 375; 109/2, 11, 19; 705/16, 44, 17, 79; 406/25, 51, 113, 148, 186, 111, 189, 188; 221/211; 380/270; 902/30, 31, 35

(56) References Cited

U.S. PATENT DOCUMENTS 3,949,364 A * 4/1976 Clark et al. ................. 235/375
4,393,788 A * 7/1983 Campbell et al. .............. 109/2
4,465,410 A * 8/1984 Vogel et al. ................ 406/111
4,510,381 A * 4/1985 Fukatsu ...................... 194/350
4,540,106 A * 9/1985 Fukatsu ...................... 221/13
5,158,155 A * 10/1992 Domain et al. ............... 186/53
5,299,891 A * 4/1994 Grosswiller et al. ........ 406/112
RE34,872 E * 3/1995 Lucero ....................... 235/381
5,816,443 A * 10/1998 Bustos ....................... 221/211
5,970,888 A * 10/1999 Sheppard ..................... 109/10
5,975,273 A * 11/1999 Zwahlen et al. ............ 194/206
5,991,410 A * 11/1999 Albert et al. ................ 705/78
6,003,008 A * 12/1999 Postrel et al. ................. 705/4
6,146,057 A * 11/2000 Gromley et al. .............. 406/10
6,328,207 B1 * 12/2001 Gregoire et al. ............ 235/379

FOREIGN PATENT DOCUMENTS

EP 1093092 * 3/2001 ............. G07F/9/02

* cited by examiner

*Primary Examiner*—Karl D. Frech
*Assistant Examiner*—Edwyn Labaze
(74) *Attorney, Agent, or Firm*—Ralph E. Jocke; Daniel D. Wasil; Walker & Jocke

(57) ABSTRACT

A transaction system (104, 144) includes a customer station (116, 146) and a service provider station (112, 148). Items such as medical items, are passed between the service provider and the customer station through item transport devices (118, 154). An enclosure (10) positioned at the customer station houses a payment terminal (16) therein. A movable cover (14) is moved responsive to inputs to a remote control device (36) at the service provider station to enable a customer at the customer station to access the payment terminal. Through inputs to the payment terminal, the customer is enabled to make payment for items that are provided to the customer by the service provider.

43 Claims, 9 Drawing Sheets

ELECTRONIC TRANSACTION TERMINAL SYSTEM

CROSS REFERENCE TO RELATED APPLICATIONS

This application claims the benefit of U.S. Provisional Application No. 60/210,849 filed Jun. 9, 2000.

TECHNICAL FIELD

This invention relates to systems for carrying out transactions. Specifically this invention relates to a transaction terminal system in which a service provider enables a customer to selectively gain access to a transaction terminal at a customer station for purposes of carrying out an activity related to a transaction such as making payment for items that have been provided by the service provider.

BACKGROUND ART

Consumers have found it convenient to pay for purchases of goods and services using credit cards and debit cards. Increasingly consumers are also making payment for goods and services using so called "smart cards." Such card-based transactions have become popular because they avoid the need to carry cash. Using such accounts also often provides the consumer with a record of how their funds are spent. The use of certain cards such as credit cards also provides the consumer with an opportunity to defer making payment as well as to rescind transactions in the event of a dispute. Certain cards also have associated premiums that allow a consumer to accumulate benefits based on the amount of transactions carried out using the card.

In a consumer retail environment, card-based transactions have been carried out at a checkout or similar location in a store where the prices for the items that the consumer has selected for purchase are totaled. The consumer then has the option of paying by cash, check or card. If the consumer chooses to pay by card, the cashier or consumer will pass the card through a card accepting terminal to read information thereon. Such information may include indicia encoded on a magnetic stripe on the card which corresponds to the consumer and/or their account. Alternatively in the case of a "smart card" the terminal may be operative to read indicia recorded in a memory of the card. The information from the terminal is then passed through a communication system to a computer which indicates whether the transaction is authorized. A response from the authorizing computer enables the consumer to receive their goods. The transaction messages also result in the merchant receiving payment from the consumer's account.

Benefits may be had to consumers and merchants by making some types of transactions more convenient. One way that this may be accomplished is to enable consumers to make purchases without having to enter the establishment of the merchant. This might be accomplished for example by having a consumer make purchases from a customer station located in a drive-through lane located adjacent to the exterior of the building housing a retail establishment. Alternatively consumers may make purchases at a walk-up customer station located inside or outside of the retail establishment. In such transaction environments it is envisioned that consumers may place their orders directly at the customer station. Alternatively it is envisioned that customers may place their orders in advance of arrival at the establishment by telephone or online electronically such as through the Internet. In this way a customer's order may be assembled and waiting for them at the time the customer arrives. The customer may then make payment or confirm payment arrangements that have been previously made, and receive the items that they have arranged to purchase.

One exemplary application for a system of this type is for providing medical items to consumers from a pharmacy. Often when a consumer needs medical items, they may not wish to enter a retail establishment because they or someone they are caring for, are feeling ill. Such consumers are also concerned about receiving their medical items quickly so that they may begin the medical treatment as soon as possible. It should be understood however that a use of such a transaction system in connection with a pharmacy is exemplary and the present invention may be employed with numerous types of transaction systems.

A potential drawback of the types of the envisioned transaction systems mentioned above is that there may be some inconvenience to the consumer associated with making payment using a card. For example, in order to make payment using a credit card, a consumer may have to surrender their card to a service provider. Some consumers are concerned about surrendering their card to a stranger. Some users may be concerned that they cannot observe the service provider at all times to be sure that the service provider does not duplicate information from the card or use the card for an unauthorized purpose. The use of credit, debit and smart cards can also present somewhat awkward transaction processing sequences. For example, in the case of a credit card, the user may surrender their card to the service provider, have it returned with a receipt requiring the consumer's signature, then once the receipt is signed the consumer must return at least one copy of the receipt to the service provider. Debit card transactions may also be complicated. This is because to complete the transaction the user needs not only the card, but must also input a secret number or PIN into a terminal. The consumer does not wish to disclose their secret number to a sales clerk as to do so may compromise security. Similarly smart cards have traditionally required PIN numbers or other security measures in order to access the value stored thereon.

Thus there exists a need for a transaction system which enables a consumer to carry out transactions in a drive-through or walk-up environment and which reduces the drawbacks associated with the card-based transactions previously described.

OBJECTS OF INVENTION

It is an object of an exemplary form of the present of invention to provide a transaction terminal system that can be used for carrying out transactions.

It is a further object of an exemplary form of the present invention to provide a transaction system that can be used to carry out transactions in a walk-up or drive-through environment.

It is a further object of an exemplary form of the present invention to provide a transaction system that facilitates carrying out card-based transactions.

It is a further object of an exemplary form of the present invention to provide a transaction system that can be used to selectively provide access to a card actuated transaction terminal.

It is a further object of an exemplary form of the present invention to provide a transaction system that can be used to selectively provide access to a number of different types of terminals.

It is a further object of an exemplary form of the present invention to provide a transaction system that enables a service provider to restrict access to a transaction terminal.

It is a further object of an exemplary form of the present invention to provide a transaction system in which a service provider is enabled to selectively provide enhanced access to a card actuated terminal.

It is a further object of an exemplary form of the present invention to provide a transaction system that may include an item transport for transporting items between a customer and a service provider to facilitate carrying out transactions.

It is a further object of an exemplary form of the present invention to provide a transaction system that may be used in connection with a pharmacy to service a customer in a drive-up or walk-up environment.

It is a further object of an exemplary form of the present invention to provide a method that includes carrying out transactions through use of a transaction terminal.

Further objects of exemplary forms of the present invention will be made apparent in the following Best Modes for Carrying Out Invention and the appended claims.

Certain of the foregoing objects are accomplished in an exemplary embodiment of the invention by a system having a customer station. The customer station may be for example in a drive-through lane in which a customer may move while within their vehicle. Alternatively the customer station may be a walk-up station located either in an interior area or in an exterior area of a building. The exemplary embodiment of the transaction system further includes a service provider station. At the service provider station, a service provider such as a cashier or sales associate interacts with the customer and facilitates the carrying out of at least one transaction.

At the customer station there is provided an enclosure. The enclosure houses in its interior area a card actuated terminal. Such terminal may include for example a credit card, debit card or smart card terminal. Alternatively the enclosure may house other types of terminals or input devices such as a keypad, biometric reader or other device which can be used to identify a consumer and/or their accounts. The enclosure includes a cover which is movably mounted relative to the enclosure. The cover may be moved by a drive between a closed position and an open position. In the closed position access to the interior area of the enclosure and the terminal is prevented. When the cover is moved to an open position, a consumer at the customer station is enabled to have access to the terminal. In an exemplary embodiment, the enclosure is a generally weatherproof enclosure so that the enclosure may be exposed to the elements without damaging the terminal housed therein.

In an exemplary embodiment, a remote control device is positioned adjacent the service provider station. The remote control device enables a service provider to selectively control movement of the cover between the open and closed positions. This enables the service provider to open the cover of the enclosure in appropriate circumstances to make the terminal housed therein accessible to a customer. This may be done for example when the customer indicates to the service provider that they wish to make payment using a credit card, debit card or smart card. Alternatively, the transaction terminal may be made accessible in circumstances where the consumer needs to have access to the terminal to provide identifying inputs such as PIN numbers or by a biometric input. Once the customer has provided the inputs necessary for the transaction, the service provider may close the cover by remote control. This minimizes the exposure of the terminal to the elements and minimizes the risk of vandalism.

An advantage of an exemplary embodiment is that the customer does not have to relinquish control of their card in order to carry out transactions. This maintains customer confidence and speeds transactions compared to having the service provider handle the customer's card. In an exemplary embodiment, the enclosure is adapted for controlling access to various different types of terminals which enables it to be readily adapted to different transaction environments.

An exemplary embodiment of the present invention may find particular applicability in a drive-through or walk-up pharmacy application. In such an application a customer may receive medical items at a customer station positioned in a drive-through lane or at a walk-up station. The service provider in the facility may make the terminal accessible to the customer using a remote control. The customer may then make payment for the items that they are purchasing using the terminal. After the customer has provided the necessary inputs to make payment, the service provider may provide the customer with their medical items. This may be done for example using an item transport from the service provider station to the customer station. Such item transports may include for example a deal drawer or a pneumatic tube conveyor system. Once the customer has completed use of the terminal in carrying out the transaction, the service provider may close the cover on the enclosure by remote control from the service provider station. Of course it should be understood that the present invention may have applicability in many transaction environments.

BEST MODES FOR CARRYING OUT INVENTION

Figure 1:
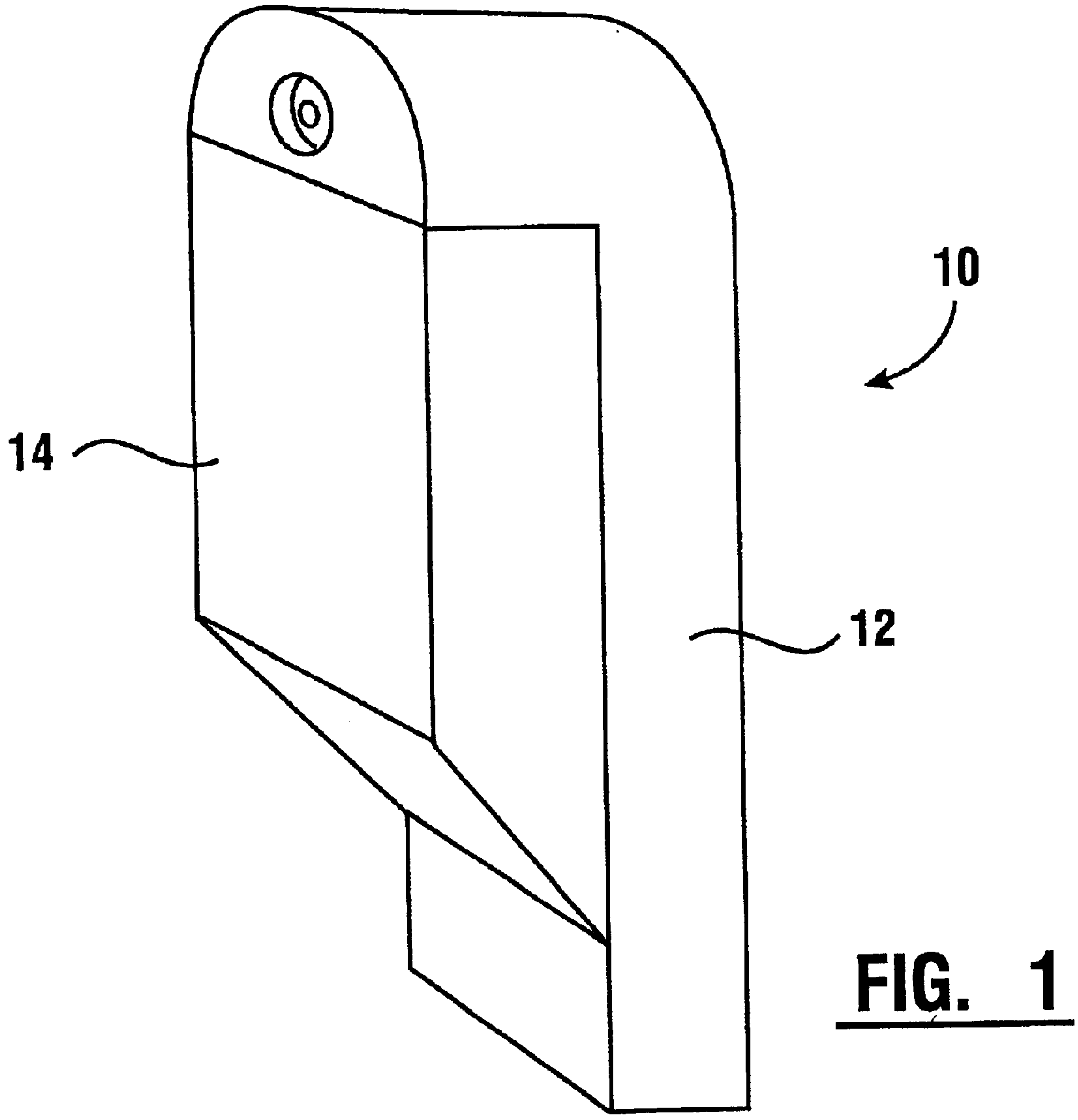
FIG. 1 is an isometric view of an exemplary terminal enclosure used in an embodiment of the invention.

Referring now to the drawings and particularly to FIG. 1, there is shown therein an exemplary embodiment of a terminal enclosure generally indicated 10. Enclosure 10 includes a body 12 and a selectively moveable cover 14 for controlling access to a terminal in an interior area of the enclosure 10. FIG. 1 shows the cover 14 in a closed position in which access to the interior area and the terminal is prevented.

Figure 2:
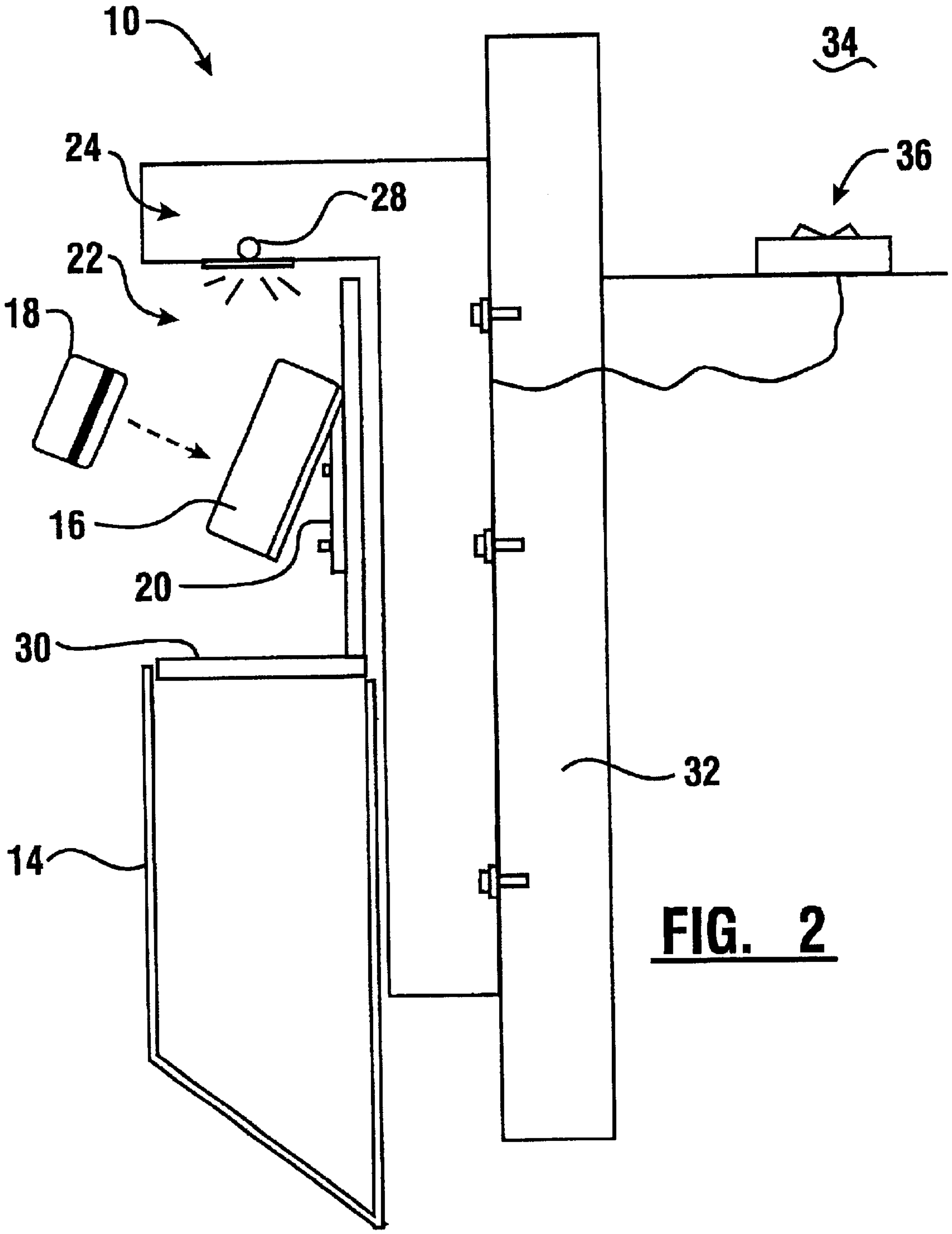
FIG. 2 is a side schematic view of the enclosure shown in FIG. 1 with the cover in an open position and a card actuated terminal accessible to a user at a customer station.

FIG. 2 shows the enclosure 10 with cover 14 moved to an open position. In the open position of the cover, a terminal 16 is accessible to a customer adjacent to the enclosure. In the exemplary embodiment terminal 16 is a card actuated payment terminal through which a customer may initiate payment using a credit or debit card. It should be understood however that in other embodiments other types of terminals or input devices may be used. These may include for example terminals including input devices such as keypads or card readers for entering information that identifies the user or the user's accounts. Alternatively terminals used in connection with the invention may include input devices such as biometric type reading devices for identifying physical, vocal or other features of users. Alternative embodiments may include input devices for reading other types of devices or articles which are carried by a user. Such articles may include for example stored value cards or smart cards in which information concerning a user and/or data representative of monetary value are stored in a programmable memory on the card. Alternative embodiments may include wireless type reading devices for reading or sensing contactless inputs from a user or device.

In the exemplary embodiment, terminal 16 is a card actuated terminal through which payment is made by a customer using a card such as a magnetic stripe card indicated 18. The terminal 16 is removably attached to a mount 20. In this exemplary embodiment the terminal 16 is removable attached to the mount using fasteners. Of course it should be understood that in other embodiments other approaches to mounting the terminal may be used. A useful aspect of the exemplary embodiment of the invention is that the enclosure has an interior area generally indicated 22 that is rendered inaccessible when the cover is in the closed position. In the exemplary embodiment the interior area is of sufficient size to hold numerous types of terminals. The exemplary embodiment of the enclosure 10 is sized such that one or more different types of terminal devices of different sizes may be mounted therein. This enables the exemplary embodiment of the enclosure to be used in connection with a wide variety of terminals and devices which customers may use to carry out transactions.

Figure 3:
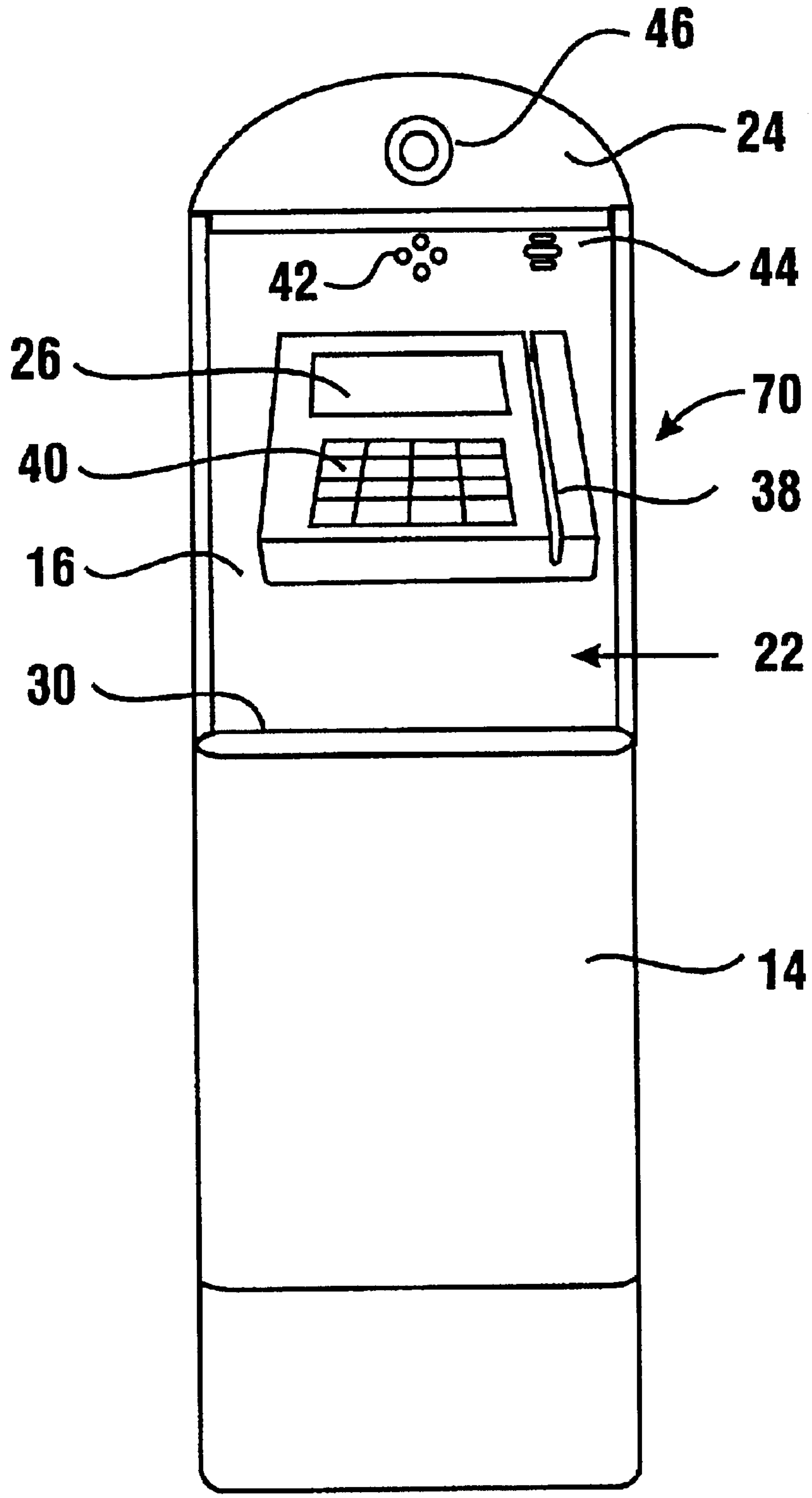
FIG. 3 is a front plan view of the enclosure and terminal in the position shown in FIG. 2.

In the exemplary embodiment, the interior area 22 is bounded by an extending portion 24 of the enclosure 10. Extending portion 24 extends in vertically overlying relation of the terminal. This configuration minimizes the exposure of the terminal 16 to the elements even when the cover 14 is in an open position. Further, in situations where the terminal 16 includes a visual display 26 as shown in FIG. 3, the extending portion 24 minimizes the sunlight and glare which may make it difficult for a user to read the display. A further advantage of the exemplary embodiment of the enclosure 10 is that terminals may be selectively mounted within the area 22 of the enclosure. As a result, terminals including displays may be positioned relative to extending portion 24 so as to optimize lighting conditions for the particular type of display on the terminal. In addition, embodiments of the invention may include a lighting device such as lighting device 28 shown in FIG. 1. Lighting device 28 may operate to illuminate the terminal so that users may more readily operate the terminal at night or under adverse lighting conditions.

As shown in FIG. 2, the exemplary embodiment of the enclosure also includes a shelf portion 30. The shelf portion 30 underlies the terminal 16. The shelf portion 30 is preferably sized to be in close fitting relation with an inside surface bounding the inside of the cover 14. In the exemplary embodiment as shown in FIG. 2, when the cover 14 is in the open position the shelf portion 30 minimizes the risk that a customer may drop items such as their credit card which may become lodged inside the open cover. In addition, shelf portion 30 in embodiments of the invention, may provide a suitable storage surface for storing items such as a pen, a customer's purse or wallet or other items that a customer or merchant may find convenient for purposes of carrying out a transaction.

As represented in FIG. 2, the enclosure 10 is adapted to be fastened to a support. Such support may include a surface of a building wall 32 such as is shown in the exemplary embodiment. The building wall may serve to separate an interior area 34 of a building from a customer station at which the enclosure is positioned. Alternatively the enclosure may be supported on a column, post or other suitable support device.

As schematically represented in FIG. 2, the enclosure 10 is in operative connection with a remote control device 36. The remote control device in the exemplary embodiment enables a service provider such as a cashier in the interior area 34, to selectively move the cover 14 by remote control. In the exemplary embodiment the remote control device enables the service provider by pressing a button to move the cover 14 from a closed position to an open position and vice versa. In the closed position of the cover shown in FIG. 1, the cover 14 is in generally abutting relation with the extending portion 24. This renders the terminal 16 inaccessible from outside the enclosure and serves to protect the terminal from exposure to the elements. In some embodiments the remote control may enable the service provider to control access to terminals or devices in multiple enclosures, such as enclosures positioned in several drive-through lanes.

In response to providing an input such as pushing a button on the remote control device 36, the cover is moved in a manner later discussed from the closed position shown in FIG. 1 to the open position shown in FIG. 2. In the open position of the cover, the terminal 16 is accessible to the user for purposes for providing inputs thereto. For example in the exemplary embodiment that is shown in FIG. 3, the terminal 16 includes input devices such as a card reader 38 and a keypad 40. These input devices enable the user to provide inputs which in the exemplary embodiment are used for making a payment. As previously discussed, the terminal 16 may also include an output device in the form of display 26. The output device may be used for providing outputs to the user. Such outputs may provide instructions or may otherwise facilitate the user's use of the terminal for carrying out transactions. The input to the remote control device 36 may also operate to cause the lighting device 28 to be actuated or cause other events to occur which facilitate operation of the terminal by the user.

Once the activities by the customer at the terminal have been completed, the service provider is enabled to close the cover 14 of the enclosure by providing a further input to the remote control device 36. This again renders the terminal 16 generally inaccessible. This minimizes the risk of vandalism and exposure of the terminal to the elements. It should be understood that although push button type inputs are discussed as being used in connection with the remote control device to control the position of the cover in the exemplary embodiment, in other embodiments of the invention other approaches to controlling the position of the cover may be used.

As will be appreciated from FIGS. 2 and 3, in the exemplary embodiment of the invention the enclosure is constructed so that when the cover 14 is in the open position access to the terminal 16 is provided on at least the front and both transverse sides of the terminal. Further as shown in the exemplary embodiment, the interior area 22 of the enclosure is such that the terminal may be mounted in such a way so that in the case of at least some terminals, access is provided to the top and bottom areas of the terminal as well. This feature is useful in that various types of terminals may require a user to access or pass a card or other device through or into side portions of the terminal. The ability of the exemplary embodiment to provide a user with access to so many different surfaces of the terminal facilitates the use thereof and enables the enclosure 10 to be adapted to a wide variety of transaction environments.

As schematically represented in FIG. 3, enclosure 10 may be adapted to incorporate other types of input and output devices. These may include for example an audio speaker schematically represented 42. Audio speaker 42 enables a user of the terminal to receive audio outputs such as instructions from a service provider. A microphone 44 may also be provided in the enclosure. Microphone 44 may enable communication with a service provider to facilitate operation of the terminal. Embodiments may also include environmental control devices within or in operative connection with the enclosure. Such environmental control devices may include for example, heaters, cooling devices, combined heaters and coolers (such as a Peltier device), dehumidifier or other device for maintaining a desired environment for the terminal within the interior area of the enclosure. The enclosure 10 may also include one or more sensing devices 46. The sensing devices may include for example, sonic or other types of sensing devices suitable for sensing a user or their vehicle adjacent to the enclosure. Alternatively, sensing devices 46 may include a camera or other imaging device for providing an indication of the presence of a user and/or for capturing images thereof. Sensing devices may also include proximity, sonic or other sensors for sensing a user's hand or items within the enclosure. Such sensing devices may be used for warning a user or a service provider and/or preventing the cover from being closed, when a user's hand or item is in the enclosure. It should be understood that the devices mentioned as included in the enclosure 10 are exemplary and other combinations of devices or different devices may be employed in embodiments of the invention.

Figure 4:
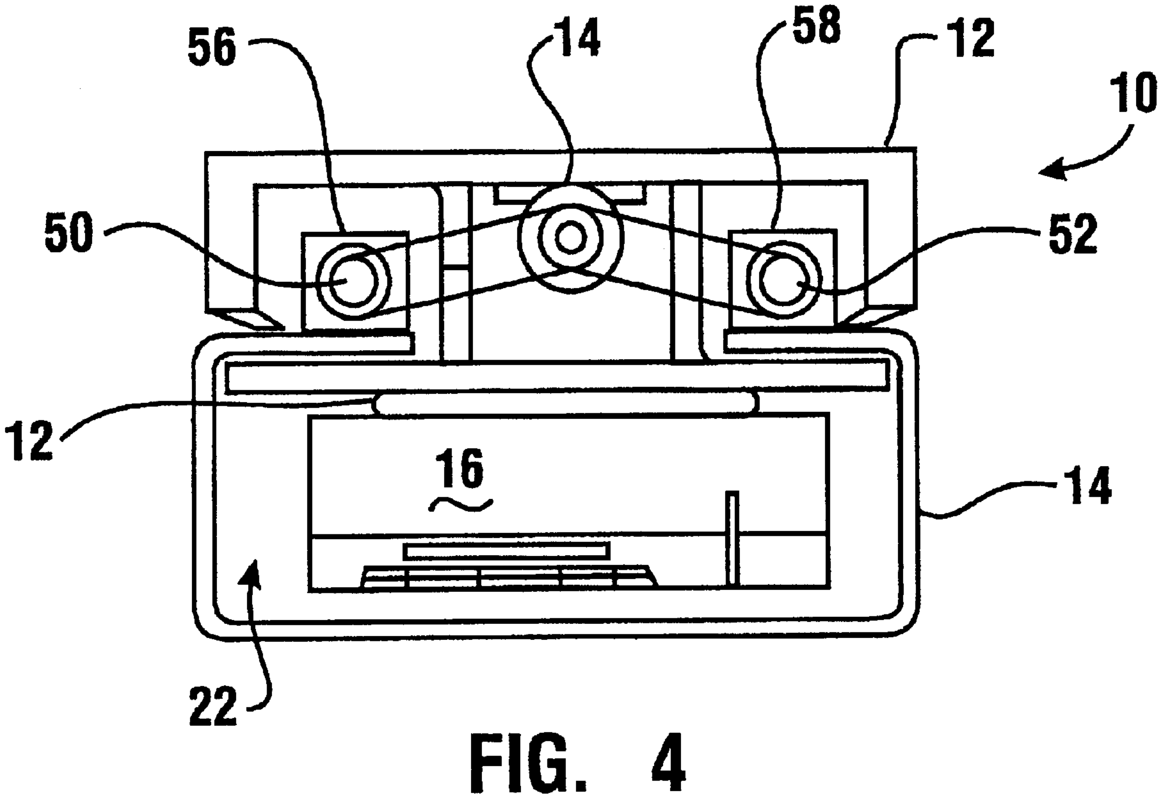
FIG. 4 is a cross-sectional side view of the drive used in an exemplary embodiment for moving the cover of the enclosure.
Figure 5:
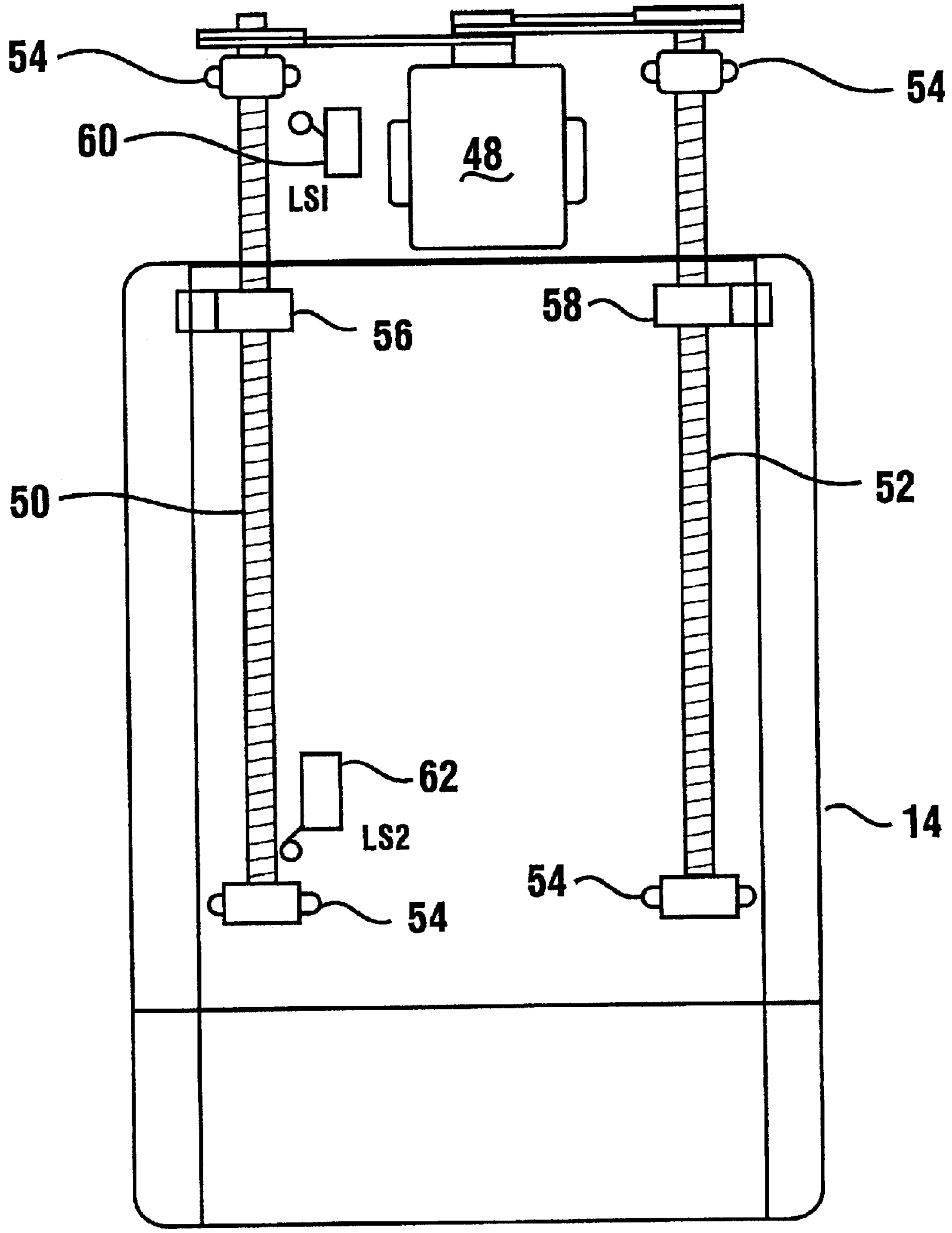
FIG. 5 is a plan view of the drive shown in FIG. 4.
Figure 6:
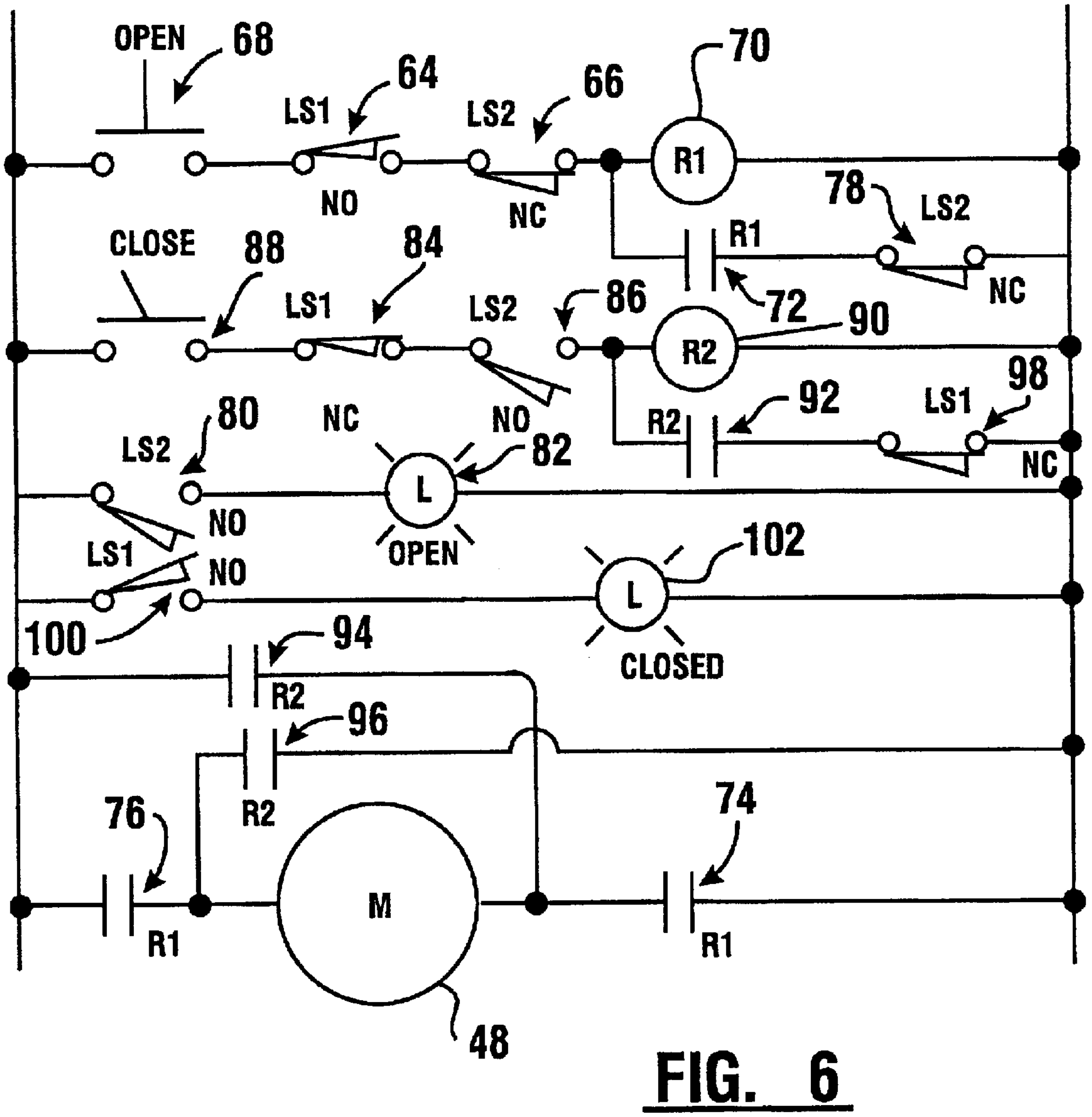
FIG. 6 is a simplified electrical schematic of the drive and remote control device used in connection with the exemplary embodiment of the enclosure.

FIGS. 4–6 show an exemplary drive used in connection with the cover 14 of enclosure 10. In the exemplary embodiment the drive includes a motor 48. The motor 48 operates to drive a pair of feed screws 50, 52 through a belt arrangement. The feed screws are supported on the body 12 of the enclosure 10 through bearing blocks 54.

A pair of followers 56, 58 are engaged with feed screws 50 and 52 respectively. Followers 56 and 58 are in operatively engaged connection with the cover 14. The followers 56 and 58, move the cover 14 in response to rotation of the feed screws. As a result, when motor 48 rotates feed screws 50 and 52 in a first rotational direction, the cover is moved toward the open position. Alternatively when the feed screws 50, 52 are rotated in an opposite rotational direction, the cover 14 is moved toward a closed position. In the exemplary embodiment a first sensor 60 is provided for sensing when the cover 14 has moved to the closed position. A second sensor 62 is provided for sensing when the cover 14 has reached the open position. In the exemplary form of the invention the sensors 60 and 62 include limit switches. Of course in other embodiments other types of sensors may be used. For example in alternative systems an automatic stop or reversing drive may be used so that the application of a load on the motor above a preset level automatically causes the motor to stop and/or reverse direction. This may be useful in preventing items from being caught in, or being damaged by the moving cover.

FIG. 6 shows an exemplary simplified schematic of exemplary circuitry for controlling the drive in response to the remote control. In the exemplary embodiment the motor 48 is a relatively low voltage DC motor which has its polarity reversed to open and close the cover. As shown in the schematic, when the cover 14 is closed, normally open contact 64 associated with sensor 60 are closed. In this position, contacts 66 which are normally closed contacts associated with sensor 62, are also closed. Closing contacts 68 which are associated with the remote control device 36 causes a relay 70 to be actuated. Once actuated, relay 70 is held actuated through closing of contacts 72. Actuation of relay 70 also causes contacts 74 and 76 to be closed which causes motor 48 to run in a first direction. Motor 48 runs to open the cover until the cover is sensed in an open position by sensor 62. This results in normally closed contacts 78 associated with sensor 62 opening which causes relay 70 to unlatch and the motor to stop.

The opening of the cover 14 also causes contacts 80 to close, resulting in illumination of at least one light 82. Light 82 may operate to illuminate the interior area of the enclosure. Alternatively or in addition, light 82 may be positioned to provide an indication to a service provider that the cover is open. Of course a plurality of lights and other devices may be actuated in response to the sensing of the cover in an open condition.

With the cover in an open condition, the normally closed contacts 84 associated with sensor 60 and the normally open contacts 86 associated with sensor 62, are closed. In this condition the closing of contacts 88 associated with the remote control device 36 causes relay 90 to engage. Relay 90 is held in latched engagement through contacts 92. Engagement of relay 90 causes contacts 94 and 96 to close causing the motor 48 to run to move the cover toward the closed position. Once the cover reaches the closed position, its position is sensed by first sensor 60. This causes normally closed contacts 98 associated with the first sensor to open, dropping out the latched engagement of relay 90 and causing the motor to stop.

In the exemplary embodiment with the cover in the closed position, contacts 100 associated with sensor 60 are in the closed position, which causes a light or other device 102 to be actuated. In the exemplary embodiment, light 102 is an indicator which indicates to a service provider that the cover of the enclosure has moved to the closed position. It should be understood that additional indicators or other types of indicators and devices may be provided for indicating to a service provider and/or a user the status of the enclosure or the system.

While in the exemplary embodiment the drive for moving the cover is a motor and screw type drive, in other embodiments other types of drive mechanisms may be used. These may include for example, hydraulic or pneumatic actuated drives, servo motor type drives, belt type drives, chain type drives, gear type drives, screw type drives, rack and pinion mechanisms or other suitable moving devices which are operative to move the cover between the open and closed positions. It should further be understood that although in the exemplary embodiment standard relay logic is used for controlling movement of the cover, in other embodiments the cover may be controlled in responsive to operation of a computer or other control device.

Figure 7:
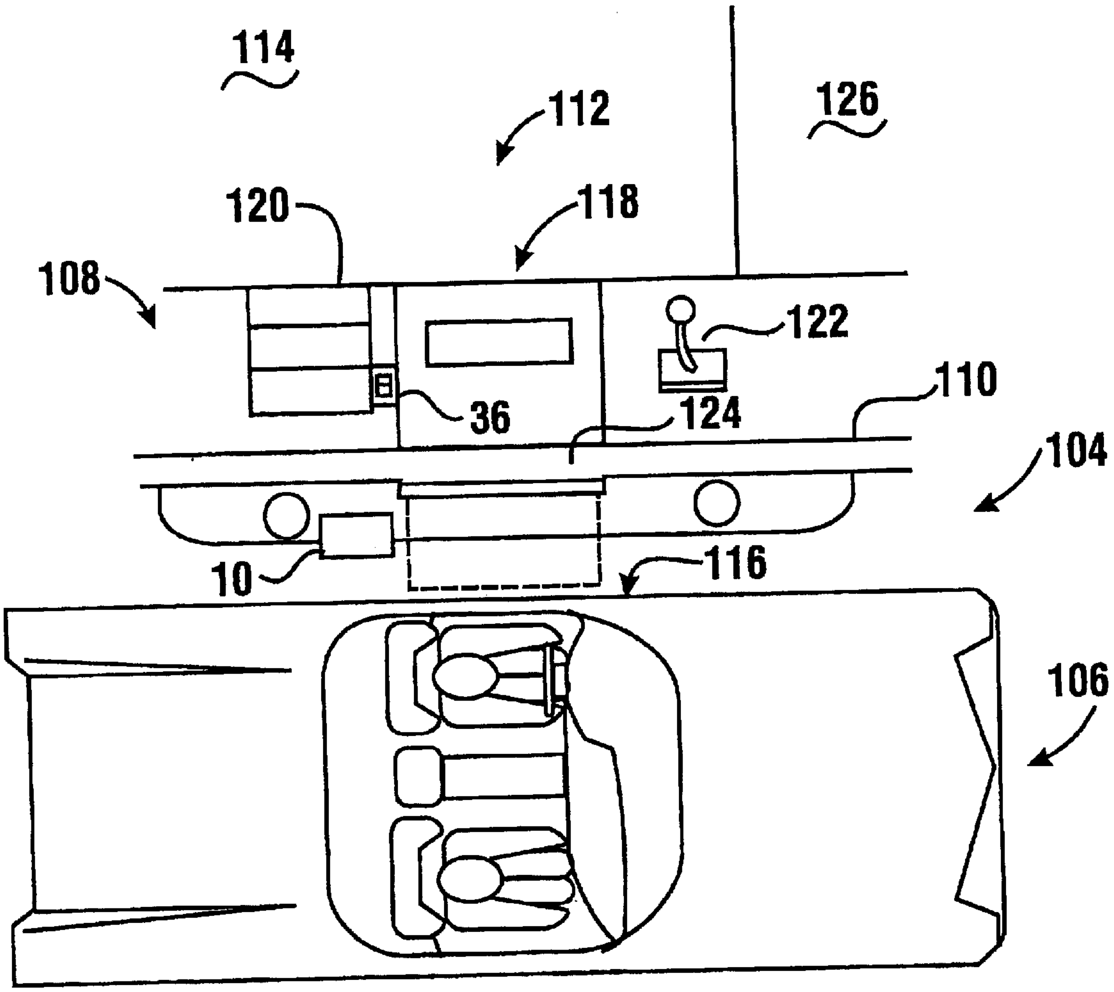
FIG. 7 is a top plan schematic view of a system used in connection with the present invention including a customer station in a drive-through lane and a service provider station in an adjacent interior area of a building.

FIG. 7 shows a first exemplary embodiment of a system generally indicated 104, employing features of the present invention. In the exemplary system 104, at least one drive-through lane 106 is provided in an exterior area adjacent a building 108. The building is bounded by a wall 110. A service provider station 112 is positioned in an interior area 114 of the building. A customer station 116 is positioned in the drive-through lane 106 on an opposite side of the building wall 110 from the service provider station 112.

In the exemplary system 104 the service provider station 112 includes the remote control device 36. The customer station 116 includes the enclosure 10 and a payment terminal housed therein. The system also includes an item transport 118. In system 104 the item transport 118 comprises a deal drawer. The deal drawer 118 is used to pass items between the service provider at the service provider station and the customer at the customer station. As represented in FIG. 7, the deal drawer may be extended to an open position such that a customer at the customer station may place items therein or remove items therefrom. The service provider at the service provider station may retract the deal drawer for purposes of placing items therein for delivery to the customer or for receiving items that the customer has placed in the drawer.

In the exemplary embodiment the service provider station 112 further includes a cash register 120. The service provider station also includes an audio input and audio output device 122 which enables the service provider to communicate with a customer at the customer station either through audio input and output devices in the enclosure 10 or other devices located adjacent to the customer station. In the exemplary embodiment, a viewing device in the form of a window 124 is positioned in wall 110. Window 124 enables the customer at the customer station to view the service provider at the service provider station and vice versa This facilitates communication for purposes of carrying out transactions.

In the exemplary embodiment shown in FIG. 7, the building 108 includes in its interior area 114 a pharmacy operation 126. The system is used for providing medical items including those from the pharmacy to customers at the customer station. Of course it should be understood that this use of the system in connection with a pharmacy operation is exemplary and many other uses are also possible.

In the operation of the system shown in FIG. 7, a user may approach the customer station 116 in the drive-through lane 106 in their vehicle. The user may have called the pharmacy ahead of time to arrange for their prescription to be prepared, or may have made such a request through the Internet, or may have arranged for their medical provider to have requested the preparation of their medication. The consumers may also take advantage of the system without having made prior arrangements to receive the items.

The service provider may observe the customer at the customer station and take action in response thereto. In the exemplary embodiment the customer provides the service provider with their prescription through the item transport 118. Alternatively the customer may provide other inputs or items which identify them and/or their prescription. The service provider may then retrieve the medical item for the user from the pharmacy 126. The service provider also determines the amount owed by the customer through the cash register 120.

If the customer indicates that they intend to pay with a debit or credit card, or other card such as a smart card, or alternatively in response to visually observing the customer's presence or activities, the service provider may open the cover of the enclosure 10 by operating the remote control device 36. This makes the terminal 16 or other device in the enclosure accessible to the user in the drive-through lane in the manner previously discussed. The user may then operate the terminal 16 in accordance with the instructions provided by the service provider or which are provided through the display on the terminal. If the enclosure houses a card actuated terminal, the user will generally pass their card through a card reader on the terminal such that indicia can be read therefrom. In addition, in the case of a debit card the user may also input a PIN number or other secret code to authenticate the identity of the user. Alternatively or in addition the device in the enclosure may receive a biometric input or other type input that may be used to identify a user or their account(s).

Figure 9:
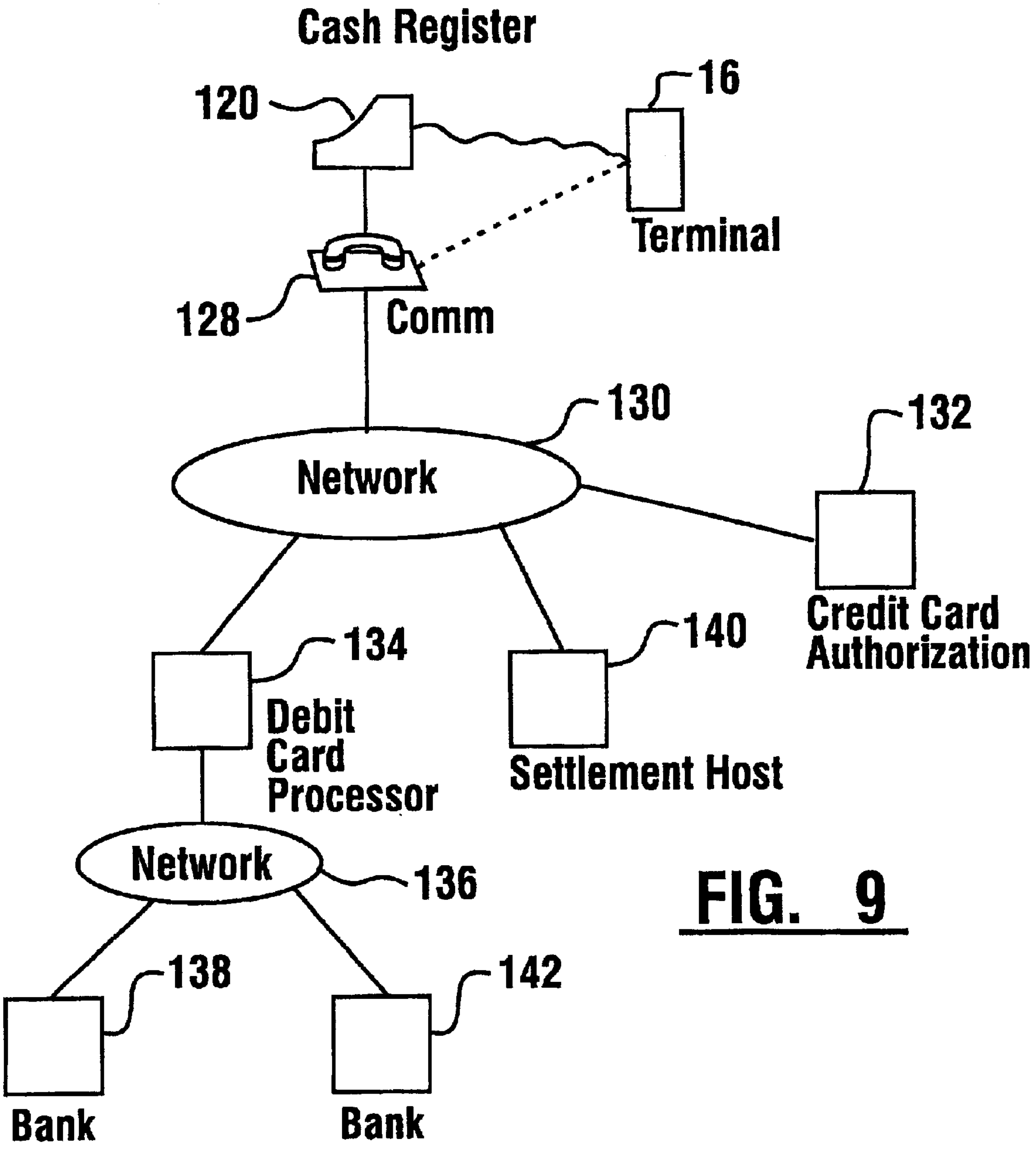
FIG. 9 is a schematic view of a network in which transactions carried out through systems of the present invention may be processed.

As represented in FIG. 9, the actuation of the terminal 16 by the user causes the terminal 16 to communicate through the cash register 120, or alternatively through other devices in connection with the service provider's facility. The information concerning the amount of the payment and the user's account is transmitted through a communications device 128 to a network 130. In the case of a credit card, the transaction request and amount may be routed to and authorized by a credit card authorization computer schematically indicated 132. Alternatively if a debit card is being used, the transaction messages may be routed through the network 130 to a debit card processing computer 134. The debit card processing computer may then route the transaction messages through a further network 136 which connects to the computer 138 of the entity having the account relationship with the customer. Computer 138 may return messages through networks 136 and 130 indicating that the transaction is authorized and/or that the customer has sufficient funds in their account to pay for the requested purchase.

Upon receiving the authorization at the service provider station 112, the cash register 120 or other device indicates to the service provider that the customer's transaction is authorized. The service provider will then provide the medical item to the customer through the use of the item transport 118. The service provider may also print a receipt at the cash register 118 or through another device for the customer. The customer may take the item and the receipt from the item transport 118, and if required, sign it and return it to the service provider through the item transport. Alternatively the terminal 16 or other device on the enclosure may include a printing device which provides the user with a receipt which the user can take, or if required, sign and provide to the service provider through the item transport.

It should be understood that in embodiments of the invention such as when debit cards or smart cards are employed, it may not be necessary for a user to sign a receipt for the item. In such case the service provider may provide a receipt to the customer through the item transport which the user may take. Likewise the terminal 16 may print a receipt for the customer which the customer may keep without having to return a copy to the service provider. As can be appreciated, various approaches may be used depending on the type and nature of the transaction. In addition, the exemplary embodiment provides for accomplishing debit, credit and other types of transactions through the system. This is facilitated by the fact that the service provider and the customer are enabled to exchange information as well as items as necessary for purposes of carrying out the transaction.

Once the customer has completed their use of the terminal 16, the service provider may provide an input to the remote control device 36 to close the cover of enclosure 10. This renders the terminal generally inaccessible to the elements as well as unauthorized persons. In addition as represented in FIG. 9, in the case of a credit card transaction a settlement host computer receives a record of the transaction and operates to charge the account of the customer and credit the account of the entity providing the medical item. Likewise in the case of a debit card transaction, the debit card processor operates to have an account of the entity providing the medical item credited for the payment by the customer. This is done by communicating with a host computer 142 at the bank of the merchant providing the medical item.

Figure 8:
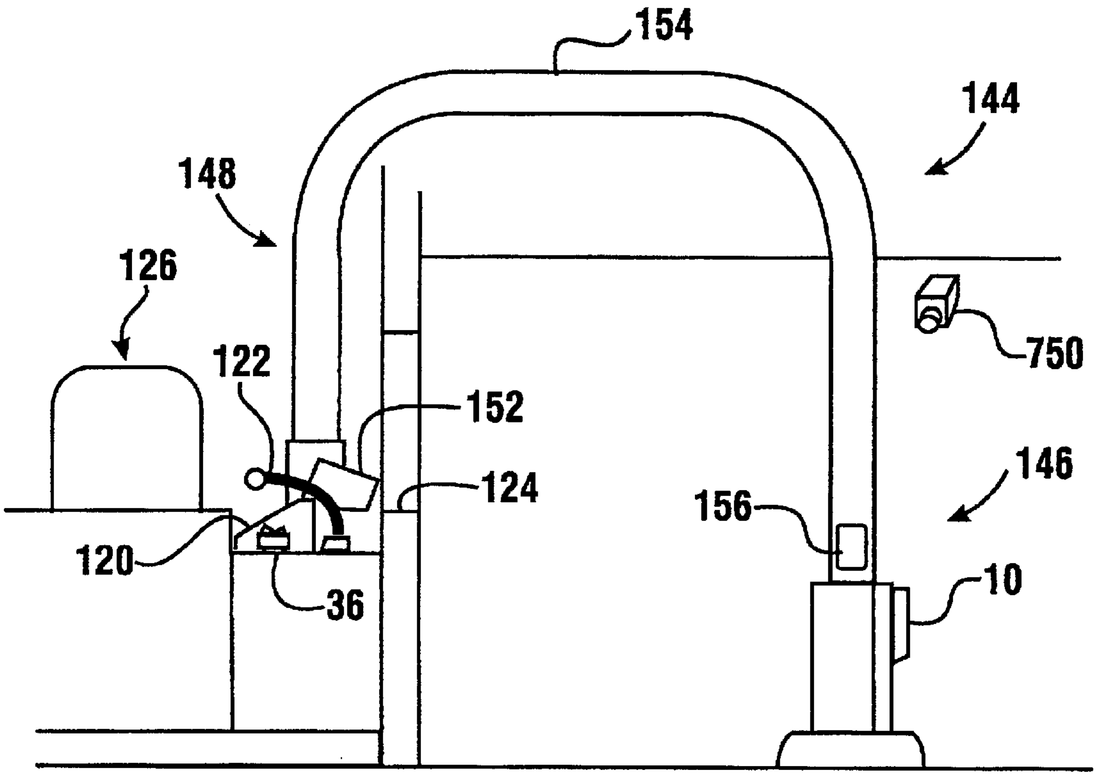
FIG. 8 is a schematic of an alternative system used in connection with an exemplary embodiment of the invention.

An alternative exemplary system 144 is shown in FIG. 8. System 144 is generally similar to system 104 accept as specifically mentioned.

System 144 includes a customer station 146. Customer station may be positioned in a drive-through or walk-up location either in an interior or exterior area of a building. Customer station 146 includes enclosure 10 which houses a terminal and/or other device used in connection with making payments. System 144 further includes a service provider station 148. The service provider station includes a remote control device 36, cash register 120, audio input and output 122 and other components suitable for carrying out transactions. In system 144 the service provider station 148 is also connected with a pharmacy 126 from which medical items may be provided.

In the exemplary system 144, a viewing device 150 in the form of a camera is provided adjacent to the customer station 146. Camera 150 is in operative connection with a video monitor 152 at the service provider station 148. Camera 150 and monitor 152 enable the service provider to view the customer at the customer station and to facilitate the carrying out of transactions. Camera 150 may be used as an alternative viewing device or as an adjunct to a window like window 124 previously described, which enables visual communication between the service provider station and the customer station.

In system 144 a pneumatic tube conveyor 154 serves as an item transport device between the customer station and the service provider station. A carrier schematically indicated 156 is moved between the customer station and the service provider station through differential air pressure. The differential air pressure may be controlled by the service provider at the service provider station. In the exemplary embodiment the pneumatic tube conveyor may be of the type described in co-pending U.S. patent application Ser. No. 09/104,579 now U.S. Pat. No. 6,146,057 which is owned by the assignee of the present invention and the disclosure of which is incorporated herein by reference as if fully rewritten herein. Of course in other embodiments of the invention, other types of item transport devices may be used.

In the operation of system 144, a customer may approach the customer station 146 and may identify themself such as through communication with the service provider. The service provider through operation of the remote control device 36 may provide the customer with access to the terminal so that the customer may cause payment to be affected through inputs thereto. The service provider in response to payment being authorized, may provide the user with the medical items or other items through the pneumatic tube conveyor. The customer and service provider may also exchange other items such as receipts, prescriptions and other transaction items through the pneumatic tube conveyor. Again it should be understood however that the use of the present invention in connection with systems for providing medical items is exemplary, and systems of the present invention may also be used in connection with providing other transaction types.

In an alternative exemplary embodiment the electronic terminal may be mounted on or within a movable carrier such as a carrier shown or described in U.S. Pat. No. 6,146,057. In such embodiments access to the terminal device used for carrying out transactions may be provided by providing one or more openings in the housing of the carrier through which input devices of the terminal may be accessed. The carrier may then be selectively rotated so that the input devices on the carrier may be accessed. Alternatively or in addition, the carrier may be selectively rotated to another rotational position to enable the customer to access the interior area of the carrier. In some embodiments this may be accomplished through use of a remote control device by a service provider.

In other alternative embodiments a terminal may be positioned with its input devices within the interior area of the carrier. In such cases access to the input devices of the terminal may be controlled by opening and closing the movable member which controls access to the interior area of the housing in the manner of the incorporated disclosure. In some embodiments the input devices and/or the terminal may be moved by moving devices positioned in the interior area of the carrier so as to make the input devices more readily accessible to the user at times when the terminal is to be used. Alternatively the terminal may be readily removably mounted in the interior area of the carrier. This may be done with clips, velcro or other releasible fasteners. This enables the service provider to place the terminal in the carrier when the customer desires to use the terminal and remove it when not required and/or when additional room is needed in the carrier for delivering items to or from the user.

In exemplary embodiments the terminal may use wireless communications methods such as RF. For example the terminal moved with the carrier may communicate with a cash register or other terminal at the service provider station using Bluetooth or other short distance wireless communication techniques. Such approaches can be used to avoid the need for wired connections to the terminal. This may be desirable in cases where the terminal and/or input devices are positioned on or in the movable carrier. Of course these approaches are exemplary and in other embodiments other approaches may be used.

In yet other alternative embodiments of the invention, other approaches to carrying out transactions may be used. For example, in circumstances where a user may have previously called in a prescription or an order to the entity associated with the service provider, the user may identify themselves or their particular transaction at the customer station by alternative methods. Such methods may include for example providing the user with a particular transaction number for their order transaction at the time that it is arranged with the provider of the items. In such circumstances the user once at the customer station, may provide the input of this transaction identifying number through inputs to the terminal. In this way the particular customer's order is readily identified. Alternatively or in addition, the user in arranging for receipt of the items may provide the pharmacy with a credit card, debit card or insurance identification number. The user may identify themselves upon arriving at the customer station by input of the corresponding credit or debit card or medical plan identification card to the terminal device. Again, in this way the customer and/or the particular items they are to receive may be identified. Alternatively biometric inputs may be used to identify a user through inputs to a terminal device. The payment by the customer and/or the charging of a particular medical plan for the items may also be facilitated in this manner. Of course it should be understood that these approaches are exemplary and many other systems and methods are contemplated as within the scope of the present invention.

Thus the new transaction terminal system of the exemplary embodiments of the present invention achieves the above stated objectives, eliminates difficulties encountered in the use of prior devices, systems and methods, solves problems and attains the desirable results described herein.

In the foregoing description, certain terms have been used for brevity, clarity and understanding, however no unnecessary limitations are to be implied therefrom because such terms are for descriptive purposes and are intended to be broadly construed. Moreover the descriptions and illustrations herein are by way of examples and the invention is not limited to the details shown and described. Further in the following claims, any feature described as a means for performing a function shall be construed as encompassing any means known to those skilled in the art to be capable of performing the recited function, and shall not be deemed limited to the particular means shown in the foregoing description as performing the recited function or mere equivalents thereof.

Having described the features, discoveries and principles of the invention, the manner in which it is constructed and operated and the advantages in user results attained, the new and useful structures, devices, elements and arrangements, parts, combinations, systems equipment, operations, methods, processes and relationships are set forth in the appended claims.

We claim:

1. A system comprising:

a drive-through lane, a building, wherein the building has an interior area adjacent to the drive-through lane, an enclosure, wherein the enclosure is adapted to house a card actuated terminal, a movable cover in supporting connection with the enclosure, a drive in operative connection with the cover, wherein the drive enables selectively moving the cover between an open position wherein the terminal is accessible from outside the enclosure and a closed position wherein access to the terminal from outside the enclosure is prevented, wherein the enclosure is positioned so the terminal is accessible from the drive-through lane in the open position of the cover, a remote control device in operative connection with the drive, wherein the remote control device is in the interior area, wherein an input to the remote control device is operative to cause the cover to move between the open and closed positions, wherein the input to the remote control device is enabled to be provided by a service provider in the interior area.

2. The system according to claim 1 wherein the enclosure includes a mount in supporting connection with the enclosure, and wherein the terminal is removably attached to the mount.

3. The system according to claim 1 wherein the enclosure includes a projecting portion, wherein the projection portion extends in vertically overlying relation of the terminal.

4. The system according to claim 3 wherein in the closed position the cover is in generally abutting engagement with the projecting portion.

5. The system according to claim 1 wherein the enclosure includes a projecting portion and wherein the terminal includes a display, and wherein the projecting portion vertically overlies the display.

6. The system according to claim 1 and further comprising a shelf portion in supporting connection with the enclosure, wherein the shelf portion underlies the terminal.

7. The system according to claim 6 wherein the shelf portion is adapted to prevent items from falling into the enclosure in the open position of the cover.

8. The system according to claim 6 wherein in the open position of the cover, the shelf portion is positioned to generally prevent passage of items between the shelf portion and the cover.

9. The system according to claim 1 wherein the terminal includes a front surface and two opposed side surfaces, and wherein the cover is configured such that in the open position the front and two opposed side surfaces of the terminal are accessible from outside the enclosure.

10. The system according to claim 1 and further comprising a drive-through lane, and wherein the enclosure is positioned so the terminal is accessible from the drive-through lane in the open position of the cover.

11. The system according to claim 1 wherein the interior area includes a service provider station, wherein the service provider station includes the remote control device, and wherein the drive-through lane includes a customer station, wherein the customer station includes the terminal.

12. The system according to claim 1 and further comprising a cash register, wherein the terminal is in operative connection with the cash register.

13. The system according to claim 1 wherein the terminal comprises a credit card terminal.

14. The system according to claim 1 wherein the terminal comprises a debit card terminal.

15. The system according to claim 1 wherein the enclosure comprises a movable carrier.

16. The system according to claim 15 wherein the movable carrier comprises a carrier movable within a pneumatic tube.

17. The system according to claim 15 wherein the card actuated terminal comprises a terminal adapted to communicate through wireless communication methods.

18. The system according to claim 15 wherein the movable carrier includes a releasable mounting device holding the terminal.

19. A system comprising:

a service provider station;

a customer station including:

an enclosure, wherein the enclosure houses a terminal, wherein the terminal includes a card reader, a movable cover in supporting connection with the enclosure, a drive in operative connection with the cover, wherein the drive enables selectively moving the cover between an open and a closed position, wherein in the open position the card reader is accessible from outside the enclosure, wherein in the closed position access to the card reader from outside the enclosure is prevented, a cover control device, wherein the cover control device is located remotely from the terminal, wherein the cover control device is operative to receive at least one input, wherein at least one input to the cover control device is operative to cause operation of the drive to cause the cover to move between the open and closed positions;

an item transport, wherein the item transport extends between the service provider station and the customer station, wherein the item transport is operative to move a transaction item between the service provider station and the customer station.

20. The system according to claim 19 wherein the service provider station is located remotely from the customer station, wherein the service provider station includes the cover control device, wherein the at least one input to the control device is enable to be provide by a service provider at the service provider station.

21. The system according to claim 19 wherein the item transport includes a deal drawer.

22. The system according to claim 19 wherein the item transport includes a pneumatic tube conveyor.

23. The system according to claim 19 and further comprising a building, wherein the building includes an interior area, wherein the interior area includes the service provider station, wherein the interior area includes a pharmacy, and wherein the item transport is operative to move medical items.

24. The system according to claim 19 and further comprising a viewing device operative to put the customer station and the service provider station in visual connection.

25. The system according to claim 24 wherein the viewing device includes a camera.

26. The system according to claim 24 wherein the viewing device includes a window.

27. A method comprising:

a) providing an enclosure having an interior area at a customer station, the enclosure having a movable cover, wherein the cover controls access to the interior area;

b) providing a payment terminal in the interior area of the enclosure;

c) opening the cover responsive to an input to a remote control device by a service provider to enable a customer at the customer station to access an input device on the payment terminal.

28. The method according to claim 27 wherein the input device includes a card reader, and further comprising subsequent to (c)

d) accessing the card reader.

29. The method according to claim 27 wherein in step (c) the service provider provides the input responsive to visual observation of the customer at the customer station.

30. The method according to claim 27 and further comprising:

d) making a payment by the customer responsive to at least one input to the terminal.

31. The method according to claim 30 wherein step (d) includes reading a card through operation of the terminal.

32. The method according to claim 30 and further comprising:

e) providing an item to the customer at the customer station through an item transport.

33. The method according to claim 32 wherein the payment in step (d) is made in exchange for the item provided in step (e).

34. The method according to claim 30 and further comprising:

e) subsequent to step (d) closing the cover responsive to an input to the remote control device.

35. The method according to claim 32 wherein in step (e) the item provided includes a medical item.

36. The method according to claim 35 and wherein in step (a) the enclosure is provided adjacent to a drive-through lane.

37. The method according to claim 36 wherein in step (a) the drive-through lane is provided adjacent to a building having an interior area including a pharmacy, wherein in step (e) the medical item is provided from the pharmacy.

38. The method according to claim 32 wherein in step (e) the item transport includes a deal drawer extending through a building wall, and wherein the item is provided to the customer through the deal drawer.

39. The method according to claim 32 wherein step (e) the item transport includes a pneumatic tube conveyor, and wherein the item is provided to the customer through operation of the pneumatic tube conveyor.

40. The method according to claim 27 wherein step (b) includes removably attaching the payment terminal to a mount in the interior area.

41. The method according to claim 27 wherein in step (c) with the cover in the open position the terminal is accessible to the customer at the customer station on at least three sides.

42. The method according to claim 27 wherein in step (a) the enclosure comprises a carrier movable in a pneumatic tube.

43. The method according to claim 42 and further comprising communicating wireless messages with the terminal.

* * * * *